May 20, 1924.

F. R. WEST

VALVE OPERATING MECHANISM

Filed March 23, 1922   3 Sheets-Sheet 1

1,494,763

Inventor
Frank R. West
By
Attorney

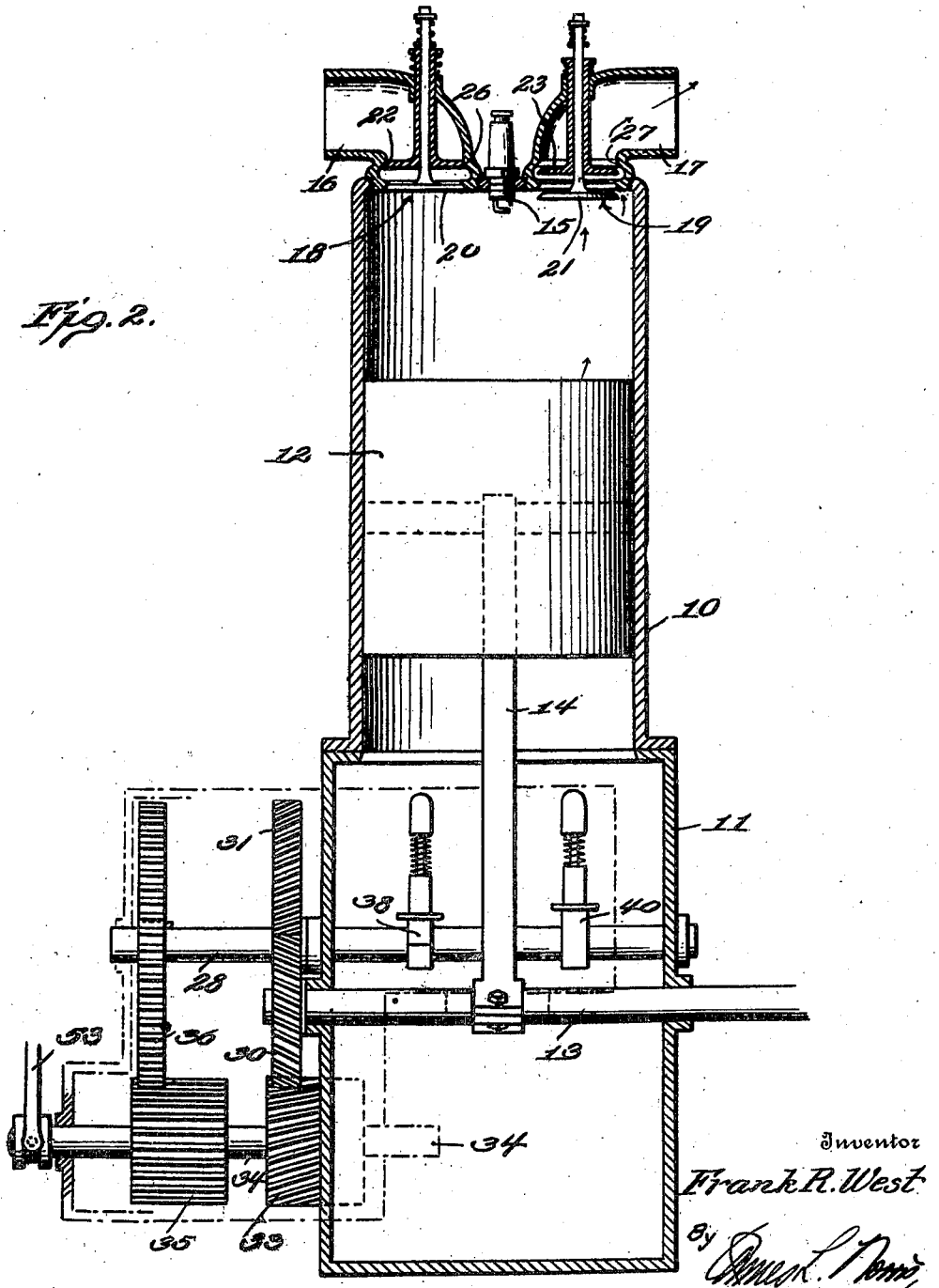

May 20, 1924.                                                    1,494,763
F. R. WEST
VALVE OPERATING MECHANISM
Filed March 28, 1922          3 Sheets-Sheet 3
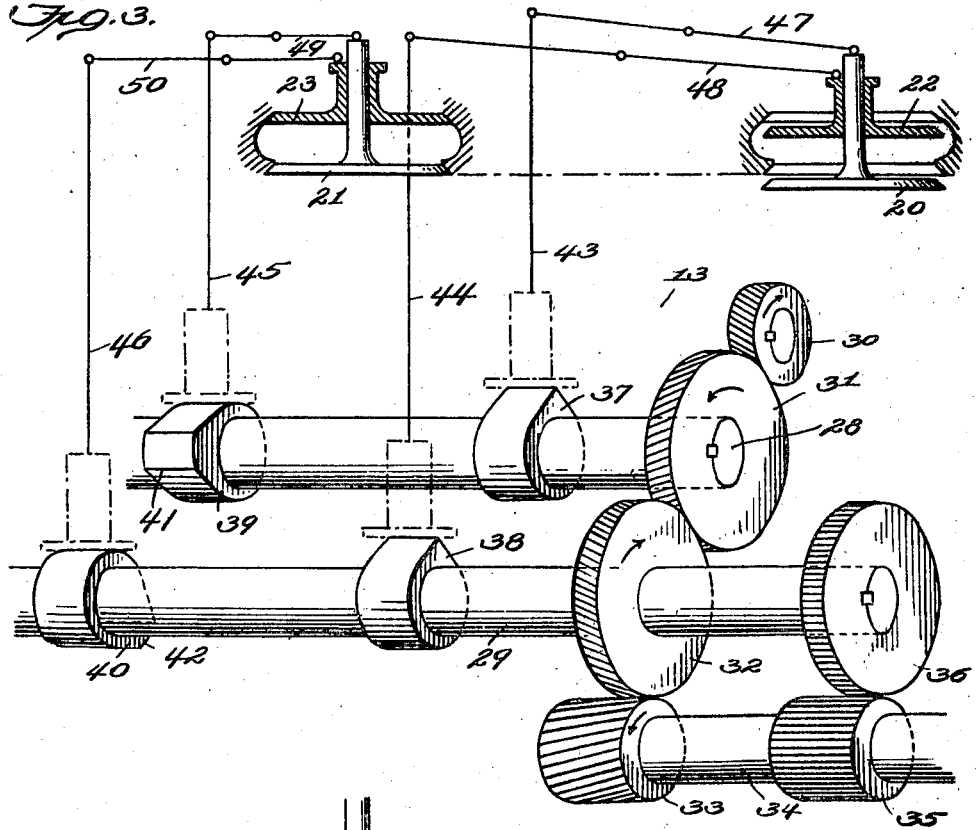
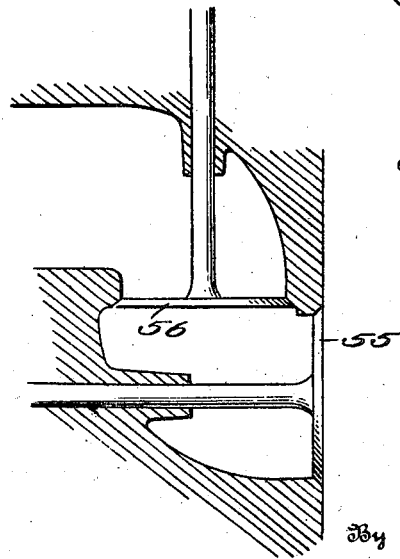
Inventor
Frank R. West
By
Attorney Patented May 20, 1924.

1,494,763

UNITED STATES PATENT OFFICE.

FRANK R. WEST, OF NEWARK, NEW JERSEY.

VALVE-OPERATING MECHANISM.

Application filed March 28, 1922. Serial No. 547,380.

*To all whom it may concern:*

Be it known that I, FRANK R. WEST, a citizen of the United States, residing at Newark, in the county of Essex and State of New Jersey, have invented new and useful Improvements in Valve-Operating Mechanism, of which the following is a specification.

This invention relates to an internal combustion engine and particularly to that type of internal combustion engine which is designed to operate under frequent variations of load, such as the engines used in the propulsion of auto vehicles.

Some of the load variations to which automobile engines are constantly subjected are those due to changes in both speed and in the steepness of grade of the surface traversed by the auto vehicle.

Ordinarily the power of the engine is varied to meet the conditions of load, by controlling the amount of combustible mixture supplied thereto, and this is usually done by means of a throttle valve interposed in the mixture line between the carbureter and the combustion chambers.

Throttle control of the combustible mixture has been proven, from the engineering standpoint, to be an inefficient way to operate an engine under variable load conditions. This is true for the reason that when the mixture supply from the carbureter to a cylinder is partially cut off, the descent of the piston creates a void which cannot be fully satisfied by the available flow of mixture, a partial vacuum thus remaining in the cylinder at the bottom of the intake stroke. This leads to at least two consequences which militate against the efficiency of the engine. These are first, a compression pressure which is less than the normal compression for which the engine was designed, and less than it would have been had no sub-pressure existed in the cylinder at the beginning of the compression stroke. This results to a proportionate extent in reduced power of the engine caused by poor combustion and difficulty in the ignition of the charge, to compensate for which a richer mixture than would be otherwise needful is generally resorted to. The other defect in throttle control is the pumping of oil from the crank case into the cylinders in which partial vacuum is created in the manner above set forth, said pumping causing a waste of lubricant, also the deposition of carbon upon the walls of the combustion chambers and fouling of the spark plugs. The present invention contemplates the varying of the degree vacuum in the combustion chamber by filling it more or less with an inert gas on the early part of the intake stroke, leaving room for the subsequent inspiration of just sufficient combustible mixture to meet the demands of the load. In this way the void within the cylinder is satisfied as fast as it is formed by the recession of the piston, and there is no partial vacuum at the beginning of the compression stroke. Therefore the maximum pressure of compression is always uniform. Moreover there cannot be excessive drawing up of the lubricating oil past the piston rings, with its attendant waste and carbon troubles as aforesaid, and the amount of combustible mixture supply to the combustion chamber is just sufficient for the needs of the engine under the particular load of the moment. As the admission of the combustion mixture follows that of the inert gas, the two gaseous bodies stratify in the cylinder with the combustible mixture on top, surrounding the terminals of the spark plug. The rapid sequence of the functions of the engine cycle precludes material diffusion between the gases of said strata.

The object of the present invention is to provide means whereby the above propitious results may be accomplished, which means may be substituted for the ordinary throttle valve and operated in a similar manner, at will, or automatically.

A more specific object of the invention relates to the grouping of valves in ports or passages and to mechanism for the variable relative operation of said valves and particularly to the arrangement of valves in the intake and exhaust ports of the cylinders of internal combustion engines or the like, with the object of improving the thermal efficiency of the engine when operating under partial load conditions.

For the attainment of these ends and the accomplishment of other new and useful objects, as will appear, the invention consists in the features of novelty in the construction, combination and arrangement of the several parts generally shown in the accompanying drawings and described in the specification, but more particularly pointed out in the appended claims.

In the drawings:—

Figure 2 is a section taken along the line 2—2 of Figure 1.

Figure 3 is a diagrammatic view showing the intake and exhaust valve of a single cylinder with the operating means therefor.

Figure 4 is a detail sectional view showing a group of valves controlling a port, the stems of the valves being in a position other than co-axial.

Figure 1:
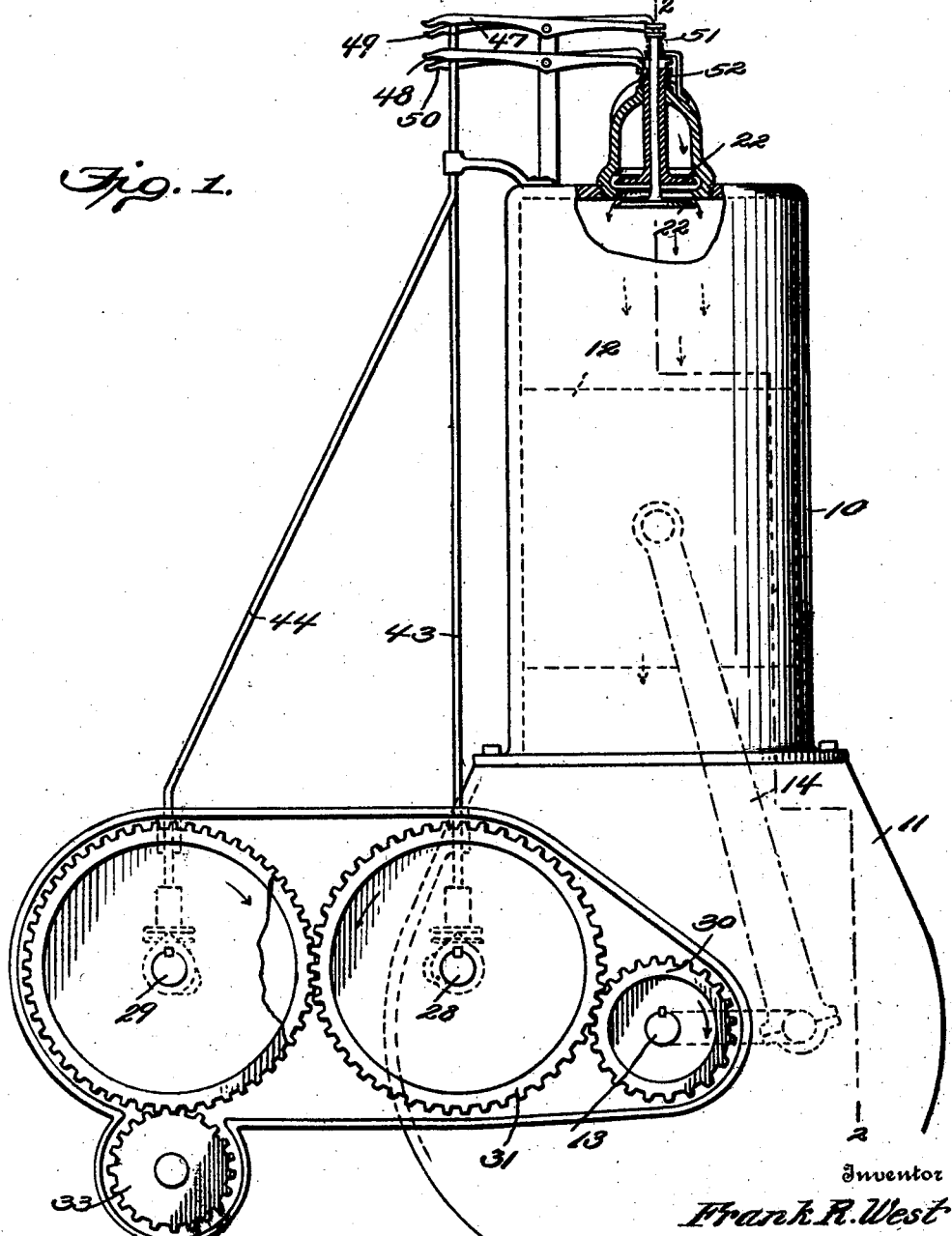
Figure 1 is a side elevation of an internal combustion engine embodying the invention of the present application, part being in section showing the intake valves.

Referring now in detail to the several figures, the numeral 10 represents a cylinder supported in any suitable manner upon the crank case 11 and in which the piston 12 reciprocates, the latter being connected to the crank shaft 13 by the connecting rod 14. The cylinder is provided with the usual intake and exhaust ports 16 and 17 respectively said ports being controlled by the respective main intake and exhaust valves 20 and 21. Said valves are operated from a cam shaft 28 through push rods 43 and 45 acting upon rocker arms 47 and 49, the latter bearing upon the stems of the respective intake and exhaust valves for operating them in proper sequence against the tension of the springs 51. The cam shaft 28 is driven from the crank shaft 13 by means of two-to-one gearing represented by the gear wheels 31 and 30, and there is nothing in the description of the construction of the engine up to the present point which is not common and normal to well known types of internal combustion engines employed in the propulsion of auto vehicles.

It is contemplated, however, in the present invention to dispense with the usual throttle valve (not shown) and to provide the engine with auxiliary variable operating valves controlling the intake and exhaust ports. To this end said ports are provided with additional valve seats 26 and 27 with which the auxiliary variable valves 22 and 23 cooperate. Said valves are, for convenience of illustration, shown with hollow stems surrounding the stems of the main intake and exhaust valves and being co-axial therewith. This arrangement of valves, however, is not essential to the invention and in special designs of intake and exhaust ports they may assume the relative positions shown at 55 and 56 in Figure 4, or be relatively arranged in other ways. Said auxiliary valves are normally held closed by springs 52.

In adapting an internal combustion engine to the use of this invention the cam 39 by which the main exhaust valve is operated is formed with a nose sufficiently broad to hold the exhaust valve open not only during the entire exhaust stroke of the piston but also during the earlier part of the intake stroke. The purpose of this is to permit the drawing in of a quantity of spent exhaust gas, or exhaust gas mixed with atmospheric air from the exhaust manifold as the piston descends on the intake stroke. The breadth of the nose 41 of the cam 39 should be designed to hold the exhaust valve open on the intake stroke for a duration that will permit the admission of the maximum quantity of exhaust gas that will ever be required in the normal operation of the engine. The object of this exhaust gas is, as stated in an earlier part of the specification, to fill the void within the combustion chamber on the suction stroke to an extent which leaves only that degree of sub-pressure necessary to draw in the proper amount of combustible mixture required by the load upon the engine. The maximum amount of exhaust gas and consequently the minimum amount of combustible mixture would be admitted at the time when the engine is under lightest load. For all other loads a smaller quantity of exhaust gas is admitted to the combustion chamber and this is controlled by shortening the duration of the open period of the exhaust port, this being accomplished by the auxiliary variable exhaust valve 23. Said valve is arranged to open synchronously with the main exhaust valve 21 when the greatest duration of opening of the exhaust port is to be maintained. The main intake valve 20 also is associated with an auxiliary variable intake valve 22, and as the quantity of combustible mixture admitted to the cylinder is complementary to the amount of exhaust gas so admitted, the auxiliary intake valve will be so controlled as to shorten the duration of the open period of the intake port at the time the duration of opening of the exhaust port is lengthened, and vice versa.

Various means may be employed for operating the auxiliary variable intake and exhaust valves in the manner so described, one of which means I have exemplified in the present embodiment of the invention, said means consisting of an auxiliary cam shaft 29 driven indirectly from the crank shaft 30 and possessing an independent oscillatory movement with respect to the cam shaft 28, said shaft having intake and exhaust cams 38 and 40 which operate the respective auxiliary variable intake and exhaust valves through suitable means such as the push rods 44 and 46 and rocker arms 48 and 50. The auxiliary exhaust cam 40 is formed, similarly to the main exhaust cam 39, with a broad nose 42 so that the opening period of the auxiliary exhaust valve will be co-extensive with that of the main exhaust valve when said valves are operated in synchronism. The auxiliary intake and exhaust cams are so set upon the auxiliary cam shaft 29 that when the main and auxiliary intake cams are positioned in the same phase as shown in Figure 3, so that the intake valves open synchronously giving the greatest duration of port opening, and therefore the maximum admission of combustible mixture to the cylinder, the auxiliary exhaust cam will cause the variable exhaust valve 23 to close before the main exhaust valve 21, in this manner shortening the duration of opening of the exhaust port and admitting a relatively small amount of exhaust gas to the cylinder.

Oscillation of the shaft 29, by means of which the length of the open periods of the intake and exhaust ports is controlled, is accomplished by means of a shaft 34 which is longitudinally movable by any manual or automatic means such as the lever 53 the latter having a forked end engaging the channel of a collar loosely mounted upon the shaft 34. Said shaft is provided with two gears, a spiral gear 33 and straight spur gear 35. The former meshes with a spiral gear 32 rotatable upon the shaft 29 and in constant mesh with the gear 31 which is driven from the crank shaft gear 30. The straight spur gear 35 meshes with a gear 36 fixed to the shaft 29. The breadth of the gears 33 and 35 is such that they remain in mesh with their respective associated gears throughout the range of longitudinal movement of the shaft 34. When the latter shaft is reciprocated the spiral teeth on the gear 33 tend to rotate the gear 32 but as the latter is positively in train with the crank shaft gear, it cannot turn synchronously with relation to the crank shaft but reacts upon the shaft 34, turning the latter and with it the gear 35 which as previously stated meshes with the gear 36. By means of this gear the auxiliary cam shaft 29 is oscillated through the desired angle, actuating in the manner aforesaid, the variable intake and exhaust valves causing an earlier or later cutting off of the duration of the open periods of the intake and exhaust ports while the main valves controlling said ports are open, the movements of said variable valves being at times in synchronism with the main intake and exhaust valves, respectively at the limits of maximum and minimum loads.

It is of course apparent that the invention does not concern itself particularly with the specific train of gearing or operating means by which the oscillation of the shaft 29 is produced relative to the cam shaft 28 nor is it essential that the valves be of the overhead type here shown. The invention however does concern itself vitally with the means both broad and specific, for controlling the amount of combustible mixture drawn into the cylinder by the suction of the piston, not by creating a greater suction as is the case where a throttle valve is used but by filling the vacuum with inert gas and thereby reducing the tendency of the cylinder to draw in combustible mixture to that extent only which is absolutely necessary for taking care of the load upon the engine.

In operation, should it be desired to reduce the duration of the open period of the intake port as when operating under reduced load or when idling, the shaft 34 may be shifted so as to throw the shafts 28 and 29, and consequently the auxiliary variable and main intake valves out of synchronism which will at the same time throw the exhaust valve operating cams into synchronism. The period of opening of the intake port during the opening and closing of the pair of intake valves will at any time be only that interval elapsing between the time of opening of that valve of the pair which opens latest and the time of closing of that valve which opens earliest. This period will always be less than the normal period of opening of the main intake valve, except when the main and auxiliary intake valves are operating in synchronism, which is their normal relation when the engine is under full load. This period may be varied at will by the operating means above described. In this manner an effective substitute for a throttle valve between the carbureter and intake manifold is provided and the amount of fuel sucked into the cylinder under variable conditions may be so regulated.

It will be further seen that as the shafts 28 and 29 revolve, operating the intake valves in nonsynchronous relation to each other the opening of the intake port is out of synchronism with the movement of the piston and retarded, and at the same time, due to the dwell produced by the broad nose of the exhaust cams, the closing of the exhaust port also is retarded so that during the first part of the suction stroke the exhaust port is open and the intake port closed. After the exhaust port closes the intake port opens and remains open during the remainder of the suction stroke. As a consequence of the exhaust port being open during the first part of the suction stroke, a certain amount of exhaust gas and atmospheric air is drawn in during this part of the stroke and positioned against the piston when the exhaust port is closed and the intake port opened and the charge of combustible mixture is sucked in and positioned on top of the exhaust gas and air, surounding the terminals of the ignition device 15. The stratified layers completely fill the combustion chamber, diffusing only to a negligible amount, and at the moment of explosion the compression is the same as when operating under full load, although less combustible mixture is used.

It will be readily understood that while, in the present disclosure, the invention is applied to a single cylinder with a single intake and single exhaust port, it may equally well be applied to the ports of a plurality of cylinders or to a plurality of intake and exhaust ports in a single cylinder, without transecting the scope of the invention and that while, as shown, each cam operates a single valve it is within the province of the invention to operate a plurality of valves by a single cam.

Wherefore I consider that my invention, resides primarily in the broad aspects hereinbefore set forth, and only secondarily in the details of construction and arrangement, and I do not restrict myself to the particular construction here disclosed, but only by the terms of the claims and the state of the prior art.

What is claimed as new is:

1. In combination with the cylinder of an internal combustion engine having intake and exhaust ports, a pair of valves for each of said ports, means for operating said valves, and means whereby the operation of the valves of one of the ports may be thrown out of synchronism while the valves of the other port are thrown into synchronism.

2. In combination with the cylinder of an internal combustion engine having a piston therein and intake and exhaust ports, a plurality of valves for each of said ports, and means adapted to throw the valves of each port into or out of synchronism whereby the valves of the intake port can be held closed and the exhaust port held open during the whole or any desired portion of the suction stroke of the piston.

3. In combination with the cylinder of an internal combustion engine having a piston therein and intake and exhaust ports, a pair of valves in each of said ports, means whereby the valves of the intake ports may be operated synchronously with each other and with the suction stroke of the piston and the exhaust valves may be operated out of synchronism with each other while at the same time the exhaust port is opened and closed synchronously respectively with the beginning and ending of the exhaust stroke of the piston.

4. In combination with the cylinder of an internal combustion engine having a piston therein and intake and exhaust ports, a pair of valves in each of said ports, cam shafts having cams thereon for operating the valves, the cams for operating the exhaust port valves being located on the shafts so as to operate the exhaust valves out of synchronism when the intake port valves are operating in synchronism, and the cams for operating the exhaust port valves being so constructed that when the intake port valves are operating synchronously the exhaust port will open and close synchronously respectively with the beginning and ending of the exhaust stroke of the piston.

5. In combination with the cylinder of an internal combustion engine having a piston therein and intake and exhaust ports, a pair of valves in each of said ports, cam shafts having cams thereon for operating the valves, the cams for operating the exhaust port valves being located on the shafts so as to operate out of synchronism when the intake port valve operating cams are in synchronism, means for throwing the intake port valve operating cams out of synchronism and the exhaust port valve operating cams into synchronism, the construction of the exhaust valve operating cams being such that when operating synchronously the closing of the exhaust port will take place after the suction stroke of the piston has begun.

6. In an internal combustion engine of the four cycle type having a piston therein, a crank shaft for operating said piston, intake and exhaust ports, a pair of intake valves for said intake port and a pair of exhaust valves for said exhaust port, a pair of cam shafts one operating in constant operative relation with the piston and the other adapted to be advanced or retarded in operative relation with said constant cam shaft, cams on each of said shafts corresponding to and adapted to operate one valve of each port.

7. In an internal combustion engine of the four cycle type having a piston therein, a crank shaft for operating said piston, intake and exhaust ports, a pair of intake valves for said intake port and a pair of exhaust valves for said exhaust port, a pair of cam shafts one operating in constant relation with the piston and the other adapted to be advanced or retarded in operative relation with said constant cam-shaft, a cam on each of said shafts corresponding to and adapted to operate one valve of each port, the position of the cams on the shafts being such that when the intake valves are operating in synchronism the exhaust valves will be operating out of synchronism, the exhaust valve operating cams being given a longer dwell than the intake valve operating cams.

In testimony whereof I have hereunto set my hand in presence of two subscribing witnesses.

FRANK R. WEST.

Witnesses:
ENOCH RECTOR,
ROBT. J. EMORY.